Nov. 17, 1925.

S. BERTONA 1,561,455

ARTIFICIAL WREATH AND METHOD OF MAKING SAME

Filed June 6, 1925  2 Sheets-Sheet 1

Salvatore Bertona INVENTOR

BY Harry Jacolen ATTORNEY

Nov. 17, 1925.  
S. BERTONA  
1,561,455  
ARTIFICIAL WREATH AND METHOD OF MAKING SAME  
Filed June 6, 1925 2 Sheets-Sheet 2

INVENTOR  
Salvatore Bertona  
BY  
ATTORNEY

Patented Nov. 17, 1925.

1,561,455

UNITED STATES PATENT OFFICE.

SALVATORE BERTONA, OF NEW YORK, N. Y.

ARTIFICIAL WREATH AND METHOD OF MAKING SAME.

Application filed June 6, 1925. Serial No. 35,273.

*To all whom it may concern:*

Be it known that I, SALVATORE BERTONA, a citizen of the United States, and resident of the city, county, and State of New York, have invented certain new and useful Improvements in Artificial Wreaths and Methods of Making Same, of which the following is a specification.

This invention relates to the method of making artificial wreaths.

Wreaths of the type to which this invention pertains must be adapted for production as cheaply as possible, while the wreaths must be strong and durable enough to withstand handling without losing their shape.

Various means in the nature of frames have been proposed for holding the leaves and berries together in circular or wreath form, but the structures heretofore used for this purpose can only be comparatively laboriously and slowly assembled and consequently are comparatively expensive to produce and this invention, therefore, contemplates the provision of an economical and rapid method of making said wreath.

In that example of my invention illustrated in the drawings.

Figure 1:
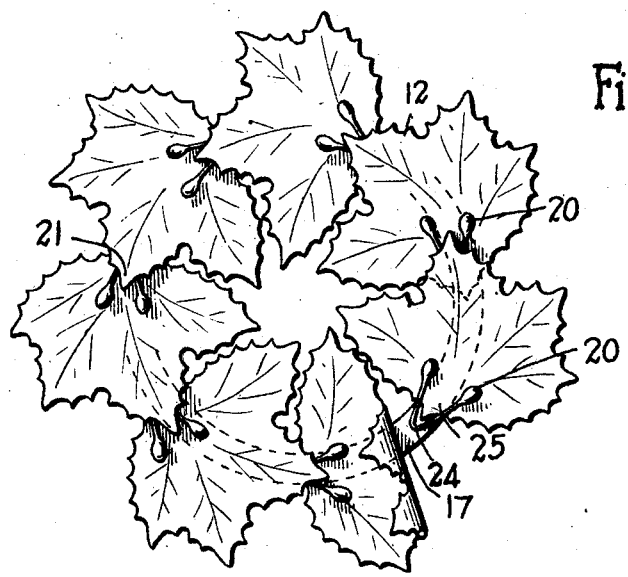
Fig. 1 is a top plan view of my invention showing one of the leaves partly removed to expose the underlying frame member and showing the positioning of the berries of the wreath.
Figure 2:
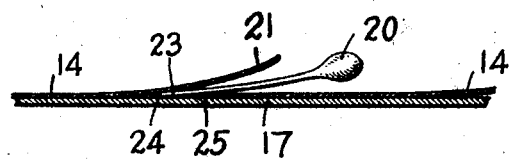
Fig. 2 is a longitudinal vertical section through one of the leaves and the frame member to which the leaf is attached showing the relative arrangement of the leaves, the berries, and the frame member.
Figure 3:
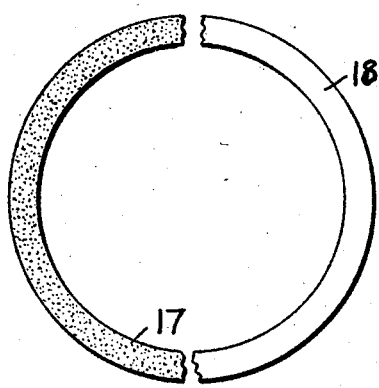
Fig. 3 is a plan view of the frame member, showing the preferred form and a modification thereof.
Figure 4:
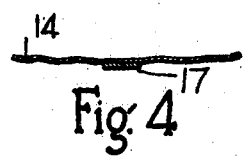
Fig. 4 is a vertical radial or cross section of a part of my improved wreath.
Figure 5:
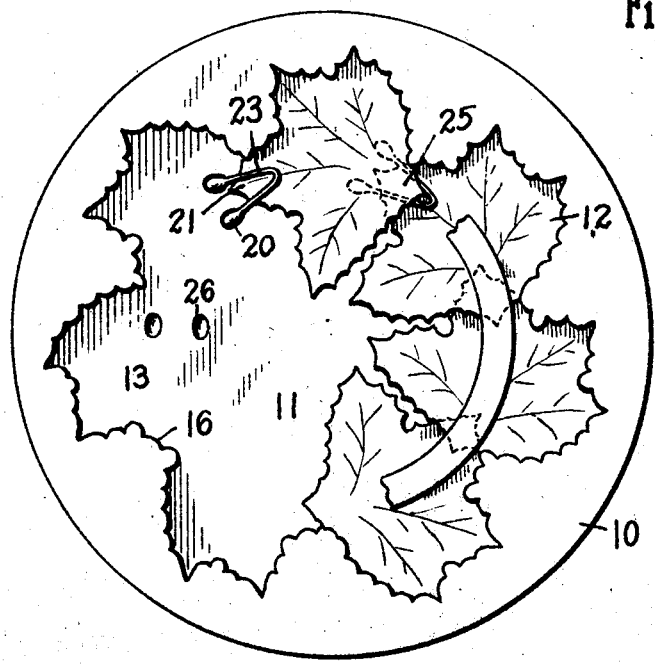
Fig. 5 is a top plan view of an assembling form in which my improved wreath may be readily manufactured showing the application of my improved method.
Figure 6:
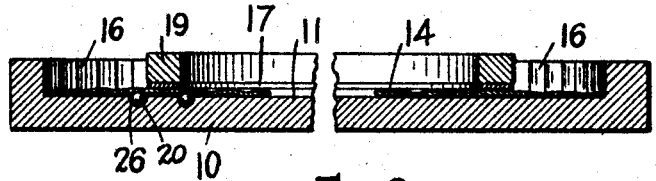
Fig. 6 is a vertical section of the same.

Artificial wreaths made of a series of paper leaves suitably covered and veined and held together in such a manner as to maintain the shape of the wreath have long been known. Various methods have also been known for securing the leaves to the frame of the wreath, but the structures and methods heretofore in general use have been comparatively expensive, particularly in time, labor and material.

In carrying out my improved method in one of its practical applications, I provide a form 10 which has a suitable depressed portion 11 therein, the shape of the upright sides of which conforms to the outer periphery of the wreath 12. The bottom 13 of the form 10 may be made flat, if desired, or said bottom may be shaped to fit the leaf surfaces exactly. If it is desired that the berries 20 be assembled with the leaves 14 in the manner hereinafter described before the wreath is removed from the form 10, I prefer to provide additional depressions 26, wherein the berries may rest without danger of being crushed when pressure is put upon said wreath.

The individual leaves 14 are placed face downwardly on the bottom 13 of the form, the outer edges of the leaf being guided into position by the upright sides 16 of the form, which sides are suitably shaped to fit said leaf. After all the leaves have been arranged in position in said form, a circular, annular stiffening ring 17 of cardboard or other suitable material is covered on one surface as 18 thereof with suitable cementing material, such as glue or paste, and then is laid with the wet side down on the uppermost leaf surfaces in proper position, after which said ring is firmly pressed into place by a suitable weight as 19 substantially of the same diameter as said ring. The ring 17 is of comparatively little thickness, though it will be understood that said ring has a base whose area is a substantial fraction of that of the wreath so that said ring reinforces said wreath effectively over a large area and prevents distortion of the wreath in any direction. Said ring is entirely concealed on the back of the wreath, since the width of the material thereof is preferably less than the width of the leaf units. The weight 19 may be allowed to remain on the ring 17 until the cementing material has set, but if it is desired to insert the berries 20 between the leaves 12 after the leaves have been attached to the ring 17, said weight may be removed before the cementing material is entirely dry, the wreath removed from the form 10, inverted so that the finished surfaces of the leaves are uppermost, the substantially central front points 21 of the leaves raised and a pair of berries 20, the stems of which have first been dipped in glue or paste, inserted thereunder, after which the point 21 may be pressed back into place.

If, however, it is desired to finish the wreath while said wreath is in the form 10, the method of constructing my improved wreath is somewhat different. In that case, a single leaf at a time is placed face downwardly in the form 10 as hereinbefore described, then a pair of berries 20 placed in the depressions 26 with the stem 23 on the leaf point 21, after said stem 23 of said berries has first been dipped in cementing material. The next leaf is then placed in position with the rear point 25 thereof over and partly covering said berries and the process repeated until all the leaves and berries have been assembled. The ring 17 may then be cemented to the uppermost surfaces of the leaves and berries which is the rear surface of the finished wreath in the manner hereinbefore described, the weight 19 being again used until the cementing material has dried sufficiently to allow the removal of said weight with safety.

The berries 20 are connected by means of a suitable wire covered with soft material such as cotton or the like for forming the stem 23 of the berry unit, which is preferably U-shaped as illustrated. If desired, the ring 17 may be made of gummed paper which has been covered on one side thereof with gum so that all that is necessary in attaching said ring to the remainder of the wreath is to moisten the gummed surface and to press the ring on to the wreath.

It will be seen that the uppermost point 21 of the leaf covers the berry stem 23, part of which may rest directly on the surface of the ring 17 as at 24 and part of which may rest on the rear leaf point 25 at the other end of the leaf. There is usually sufficient cementing material on the stems 23 of the berries to enable the point 21 of one leaf to be pasted to the upper surface of the point 25 of the adjacent leaf so that the parts are held firmly together.

I have found that wreaths made by my improved method are strong, durable, quickly assembled and maintain their shape under all ordinary conditions. It is to be understood that I do not intend to limit myself to the specific construction or method illustrated and described, for the reason that various changes may be made therein within the range of equivalents without departing from the spirit of this invention.

I claim:

1. The method of making an artificial wreath, consisting of arranging a series of independent leaves in a form in overlapping relation with the backs of said leaves uppermost, pasting a flat stiffening ring on the backs of said leaves and applying pressure to said ring.

2. The method of making an artificial wreath, consisting of arranging leaves and berry units in alternate overlapping relation in a form shaped to fit the finished wreath, pasting a flat wide ring to the backs of said leaves and to said berry units, applying pressure to said ring, and removing the wreath from the form after said ring has been secured to the wreath.

3. The method of making an artificial wreath, consisting of arranging leaves and berry units in overlapping relation in a circular shape and in inverted position, and pasting a flat circular ring to said leaves and berry units while said leaves and units are inverted.

4. The method of making an artificial wreath, consisting of arranging a series of independent leaves in inverted position about a circle, pasting a flat ring to said leaves, applying pressure to said ring for temporarily holding the leaves together, releasing the pressure before the paste on said ring has set, and then inserting berry units between said leaves.

5. The method of making an artificial wreath, consisting of arranging a series of independent leaves, in inverted position about a circle, dipping the stems of berry units into pasting material and inserting said berry units between said leaves and pasting a flat ring to said leaves and stems.

SALVATORE BERTONA.